J. O. Joyce,

Oscillating Pump.

No 3,190. Reissued Nov. 10, 1868.

United States Patent Office.

JACOB O. JOYCE, OF DAYTON, OHIO.

*Letters Patent No.* 19,699, *dated March* 23, 1858; *reissue No.* 3,190, *dated November* 10, 1868.

IMPROVEMENT IN ROTARY PUMPS.

The Schedule referred to in these Letters Patent and making part of the same.

*To all whom it may concern:*

Be it known that I, JACOB O. JOYCE, formerly of Cincinnati, Ohio, and now of Dayton, in the county of Montgomery, and State of Ohio, have invented certain new and useful Improvements in Pumps; and I do hereby declare that the following is a full, clear, and exact description of the construction and operation of the same, reference being had to the accompanying drawings, and to the letters of reference marked thereon, making part of this specification, in which—

My invention relates to that class of pumps which are constructed with an annular pump-chamber, and in which two pistons are vibrated in a circular direction, in a manner that will be fully set forth in the following description.

To enable others skilled in the art to make and use my invention, I will proceed to describe the same with reference to the drawings.

Figure 1:
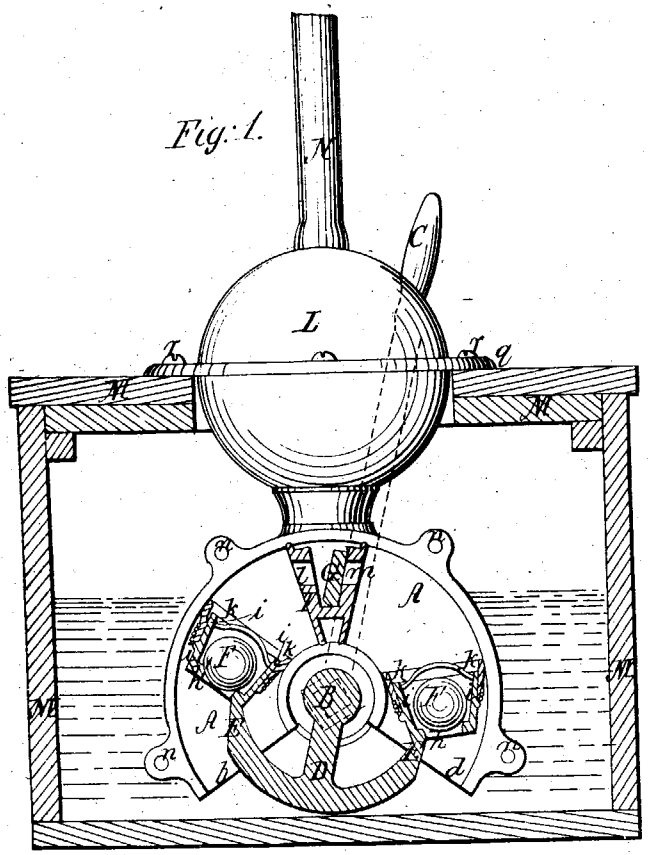
Figure 1 represents an elevation of the pump, one-half of the pump-chambers being detached therefrom, and representing the working-parts in section.

A represents the pump-chamber, which is made of an annular shape, as represented in fig. 1, and which thus forms a tube, whose cross-section is circular.

The pump-chamber A is open at both *b* and *d*, for the admission of water.

B is a shaft, which has its bearings in the hub *g* of the pump-chamber, and which shaft can be turned on its axis by applying power to the hand-lever C.

The shaft B is formed with an arm, D, the curved ends E of which serve to support the pistons *h* and *h'*.

These pistons are composed of the metal pieces *i*, provided with leather packings *k*, and valves F, which valves operate in the usual manner.

I represents a valve-chamber or casing, which is made of circular plates, of the same diameter, or nearly the same, said plates having a head or flange projecting into an annular groove or recess made across the cylinder A, as shown at fig. 1, so as to do away with any packing, and they are so located as to divide A into two equal sections, and form a central chamber wholly inside of the curved cylinder A. They are provided with passages *l* and *m*, for the admission of water, and also with a wedge-valve, G, for which valve a patent was granted to John L. McPherson and Jacob O. Joyce, on the 12th of February, 1856, and which, therefore, and for the reason that other valves may be used in the casing, needs no further description.

Figure 2:
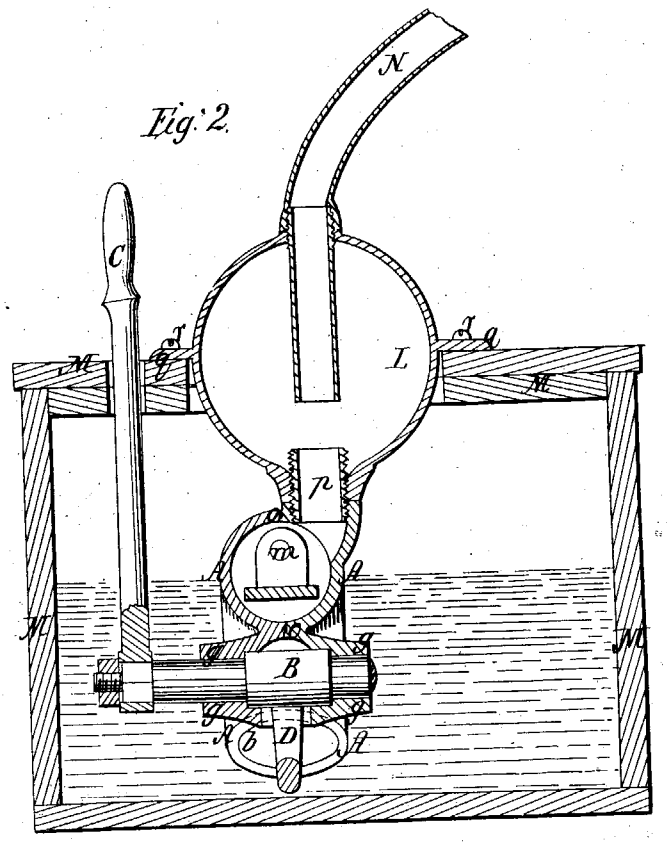
Figure 2 represents a vertical cross-section through said pump.

The two halves of the pump-chamber A are bolted together by means of screw-bolts passing through the holes *n* of the flanches of said parts, and the joints are made water-tight by the application of India rubber or gutta-percha, which is placed within corresponding grooves in said flanches, as represented in a cross-section at *o*, fig. 2.

The pump-chamber A is secured to the air-chamber L by means of a screw-joint or pipe, *p*, the air-chamber itself resting, by means of a flanch, *q*, on the top of a box, tub, or cistern, M, from which the water is to be pumped, it being attached to said top by means of screws or bolts, *r*.

The operation of this machine is as follows:

By operating hand-lever C, which is placed on the outside of the pump, and imparting to it a vibrating motion, said motion is communicated to the valves *h* and *h'* by means of shaft B and arms D E.

As the valve *h'* rises, it is closed by the action of the water, and the passage *l* is also opened for the passage of the water into the chamber enclosed by the casing I, from which it passes up into the air-chamber and out through hose N.

When the valve *h'* rises, valve *h* descends, and is opened, the valve being lifted by the water in the tank M, which fills that side of the pump-chamber in which the valve *h* works, and at the next stroke the water is forced through the opening *m*, and into the air-chamber, as before, at *h'* and *l*.

It will be seen, by this operation, that this pump is a force-pump, which is especially useful where a jet of water of considerable force is required, as for extinguishing fires, watering gardens, and other similar purposes, in which case the pump can be attached to a movable water-tight box or tank, as well as to wells and cisterns.

Having thus fully described my invention,

What I claim as new, and desire to secure by Letters Patent, is—

1. The exit-valve chamber I, when located wholly within the curved cylinder A, and held in place by beads or projections fitting annular grooves of the curved cylinder, substantially as and for the purposes specified.

2. The centrally-located shaft or bearing B, arm D, and the two arms E, provided, at their ends, with pistons or plungers, in combination with the annular chamber A, provided with the centrally-interposed valve-chamber I, so arranged that they can be operated by suitable levers or shafts located outside of the cylinder, substantially as and for the purposes specified.

JACOB O. JOYCE.

Witnesses:

WM. MITCHELL,

THOS. D. MITCHELL.